UNITED STATES PATENT OFFICE.

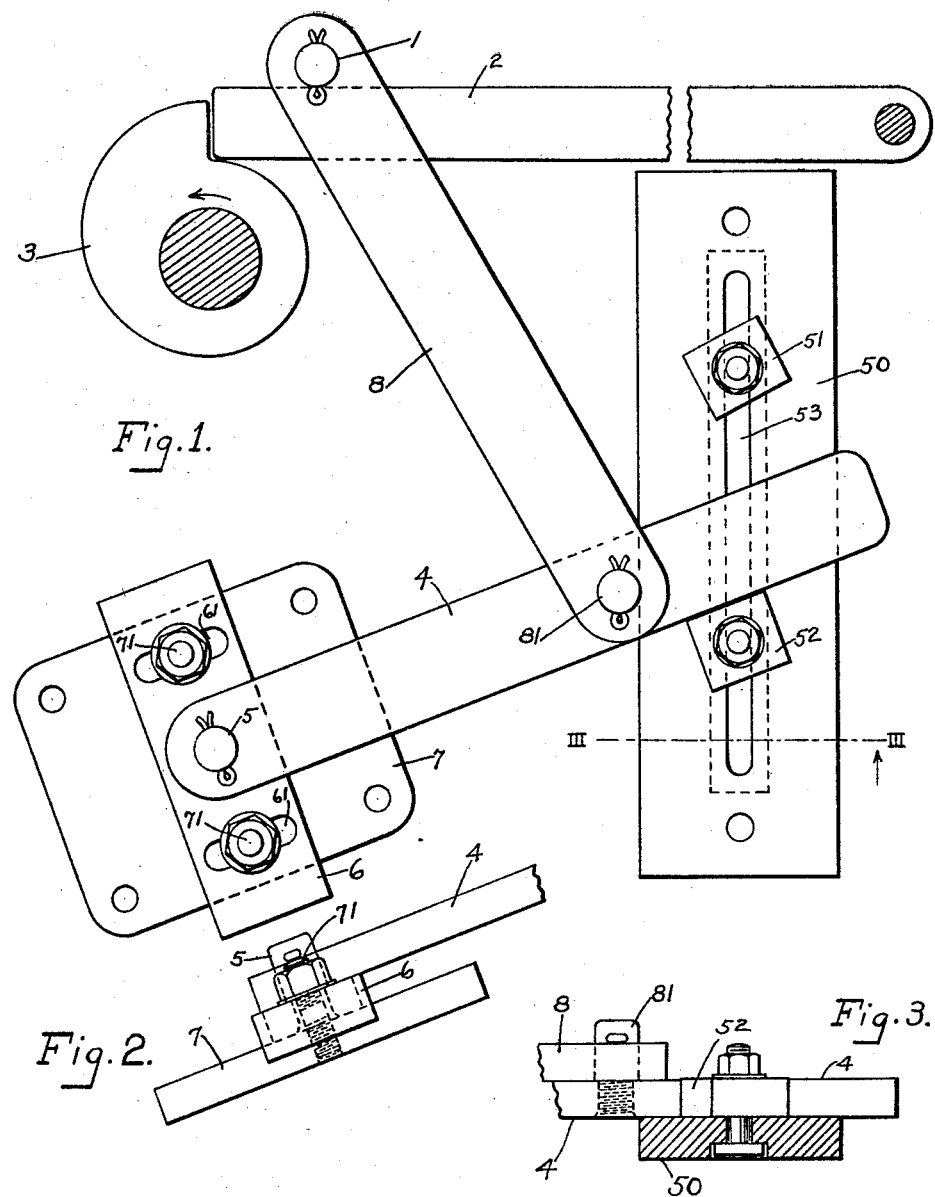

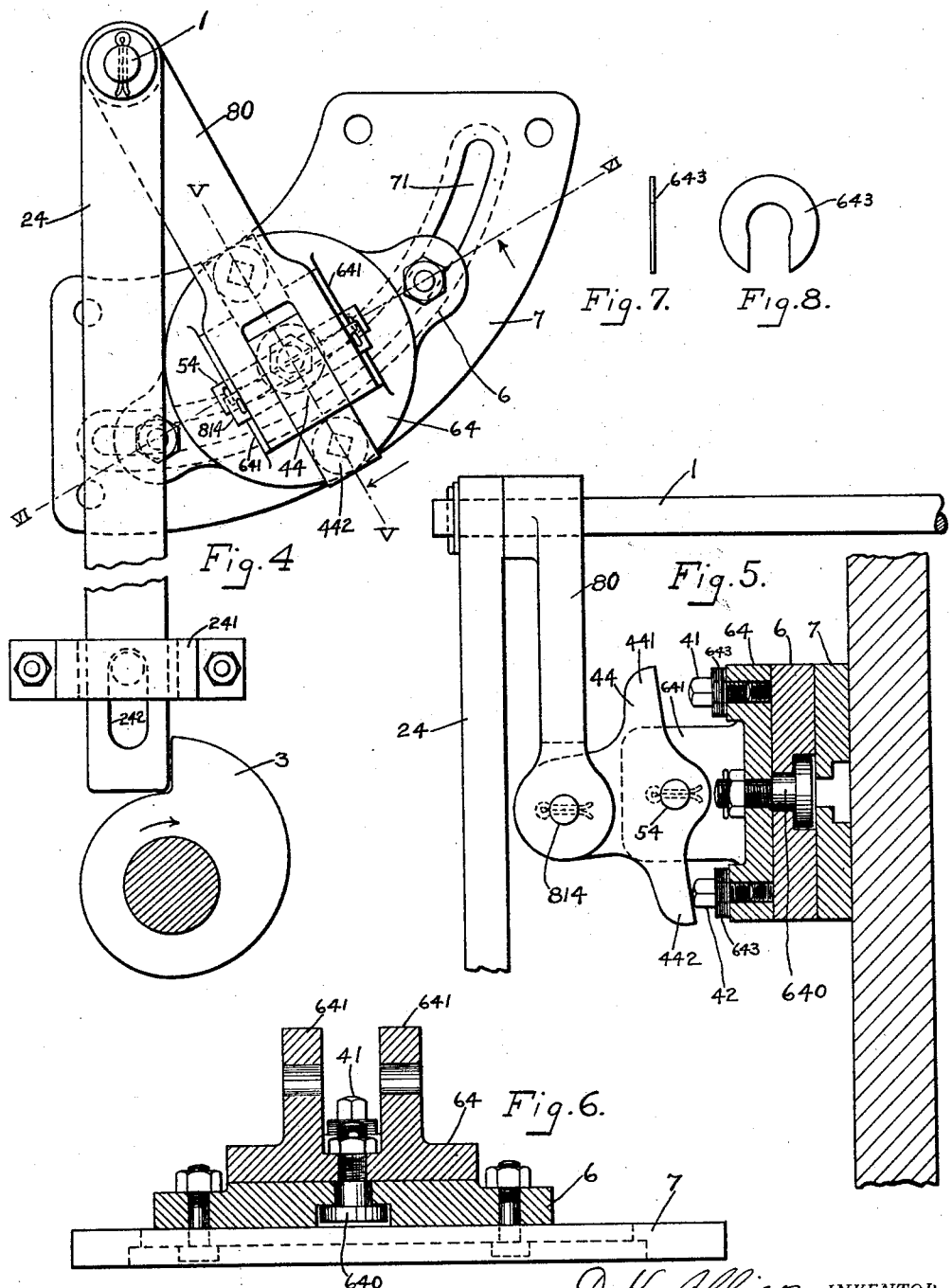

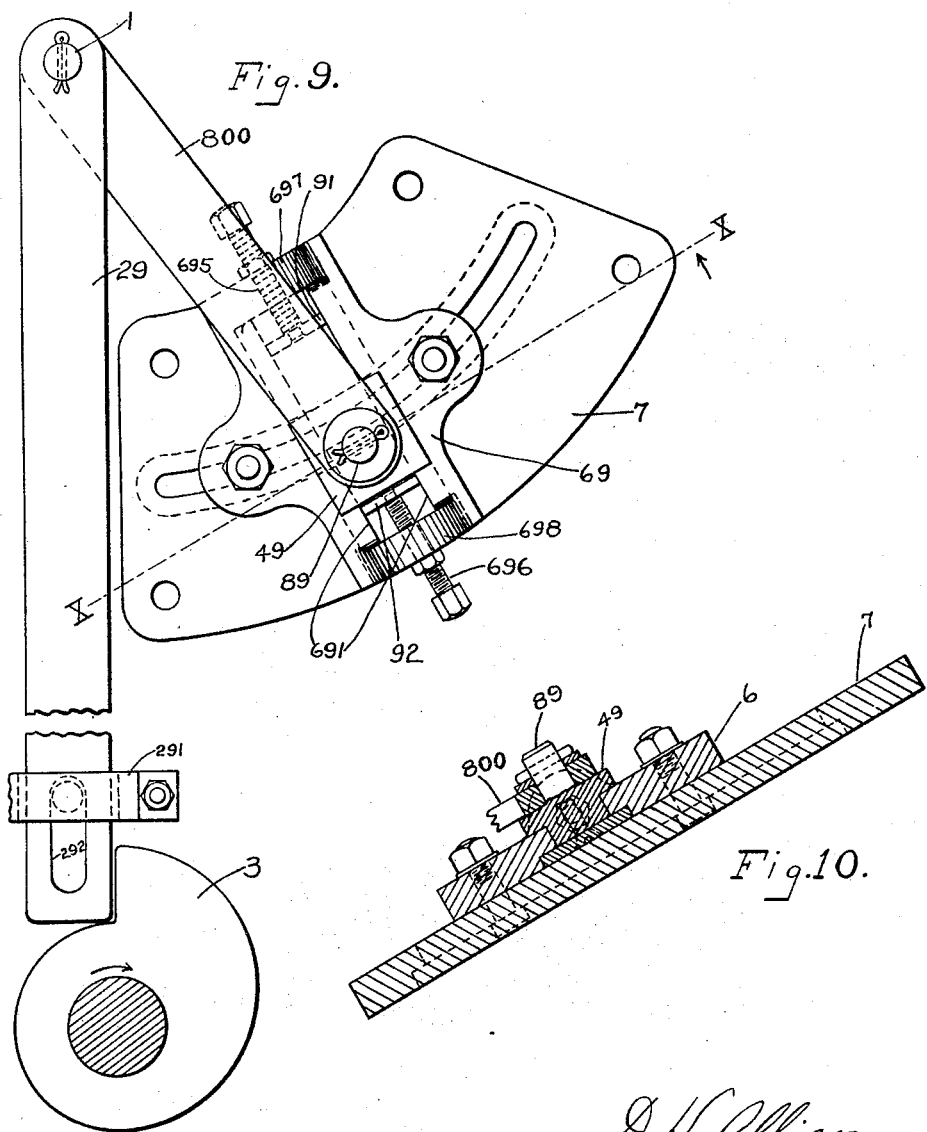

DANIEL K. ALLISON, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

MECHANICAL MOVEMENT.

1,116,780.   Specification of Letters Patent.   Patented Nov. 10, 1914.

Application filed April 30, 1906. Serial No. 314,341.

*To all whom it may concern:*

Be it known that I, DANIEL K. ALLISON, a citizen of the United States, residing at Milwaukee, in the county of Milwaukee and State of Wisconsin, have invented a certain new and useful Mechanical Movement, of which the following is a specification.

This invention relates to a mechanical movement and the object of the invention is to provide a movement for an element or carrier by means of which the carrier may be so actuated as to urge forward material placed thereon. The invention may be applied to a sieve, screen or separator, or it may be applied to a platform which has thereon a traveling bed of material. The element or carrier to which the mechanical movement is connected and which is operated therethrough may be either out of water or other liquid, or submerged therein, or it may be subjected to a blast of air. Of course the sieve, screen, separator, or platform is relatively much heavier than the parts of the mechanical movement the subject of this invention, so that the inertia or weight of the actuated device, whichever device it may be, will control the motion of the parts of the mechanical movement until such time as these parts are definitely stopped; thereafter the actuated device will have a modified motion depending on the mechanical movement.

For a complete disclosure of the invention, reference is to be made to the accompanying drawings, in which,—

Figure 1 is a side elevation, partly in section, of one form of the invention. Fig. 2 is a bottom plan view of a portion of the device shown in Fig. 1. Fig. 3 is a sectional view of a portion of the device shown in Fig. 1 taken on the line III—III. Fig. 4 is an elevation, partly in section, of a modified form of the invention. Fig. 5 is a sectional view, partly in elevation, taken on the line V—V, Fig. 4 of the modification therein shown. Fig. 6 is a part sectional view of a portion of the device of Fig. 4 taken on the line VI—VI of that figure. Figs. 7 and 8 are a side view and elevation, respectively, of the adjusting washer used in the modification of Figs. 4, 5 and 6. Fig. 9 is an elevation, partly in section, of a further modification. Fig. 10 is a sectional view of part of the modification shown in Fig. 9, taken on the line X—X.

Referring to Figs. 1, 2 and 3, an element or carrier 1 is actuated by any convenient means, such for instance as a lever 2 pivotally mounted upon a stationary part, not shown, and actuated by cam 3 in such a way that the element or carrier 1 is raised vertically during a part of the revolution of the cam 3, and is suddenly free to drop during another part of the cam's revolution. The element or carrier 1, which is conventionally shown merely as a rod, but to which in practice an actual carrier in the form of a sieve, separator, platform or any other similar means may be attached, is guided in its actuation by the mechanical movement which is the subject of the present invention and which may be used in duplication with the actual carrier. Any form of means may be used for actuating the element or carrier 1 in such a way as to be raised thereby at intervals, and at other intervals to be free to fall.

Another form of actuating means is shown in Figs. 4 and 9. This means consists of a longitudinally actuated rod 24, 29, pivotally connected to the carrier 1. This rod 24, 29, has a guiding means consisting of a strip 241, 291, bolted to a stationary means, not shown, and which embraces the rod 24, 29, and serves as a support for an inwardly projecting pin coacting with a slot 242, 292, in the rod 24, 29. The rod 24, 29, is longitudinally actuated by a cam 3, similar to cam 3 of Fig. 1.

Again referring to Figs. 1, 2 and 3, the guiding means for the element or carrier 1 consists of the following: A swinging or vibrating element 4 is pivotally mounted on a pin 5 projecting from a sliding plate 6, adjustably sliding on base plate 7 which is bolted to a stationary means, not shown. The sliding plate 6 is adjustable on the base plate 7 by means of slots 61, 61, in the sliding plate 6. These slots should extend transverse to the general direction of the length of the link 8 hereinafter described and may be either straight or curved. Through these slots 61, pass bolts 71, screwing into the base plate 7. These bolts, by means of nuts and washers, hold the sliding plate 6 securely to the base plate 7 in adjustable position.

The swinging or vibrating element 4 is connected to the element or carrier 1 by means of a link 8 pivotally connected to each of these two parts. The connection with the vibrating element 4 is made by pin 81. This link 8 is so arranged as to have a certain angular position with respect to the direction of actuation of the element or carrier 1 or to a stationary part. This structure provides a means for vibrating link 8 bodily about pin 5 and also pivoting same on pin 81; in other words, it provides a vibrating and pivotal coaction of the link with a stationary part. The vibrating element 4 is pivotal on an axis fixed as to the link 8. It is obvious that the angularity of the link 8 may be adjusted or altered by the means just described of the sliding plate 6 adjustably mounted on the base plate 7.

The swinging or vibrating element 4 extends somewhat beyond the pivotal connection by the pin 81 to the link 8 and to limit the vibration this freely extended end of the swinging element 4 coacts with stops 51, 52, adjustably mounted on plate 50 which is bolted to a stationary part, not shown. The stops 51, 52, are shown as blocks and are adjustably secured to the plate 50 by means of bolts passing through them and through a slot 53 in the plate 50. The upper stop 51 is shown slightly out of the position which it would assume during normal operation of the device, the adjustability of this stop 51, however, permitting its proper location during said operation. This slot 53 extends transverse to the general direction of the length of the swinging element 4 and may be either straight or curved.

In the modification shown in Figs. 4, 5 and 6, the swinging or vibrating element 44 is mounted to swing in a plane at right angles to the plane of swing of link 80, instead of swinging in the same plane as in the modification hereinabove described. Moreover, the link 80 always lies in the plane of swing of the element 44. In this modification the base plate 7 is shown in the shape of a quadrant, though this need not necessarily be of this shape. Plate 6 is shown as slidable upon base plate 7 and may be adjusted to any position thereon within the limits of the slot 71 in the base plate. This slot extends transverse to link 80 and may be straight or curved. The plate 6 is secured to base plate 7 in its adjusted position by means of bolts taking through slot 71 in an obvious manner. A turnplate 64 is pivotally mounted on plate 6 by means of a headed stud bolt 640 passed through plate 6 and securely attached to turn plate 64 and having its head coacting with a countersink in the bottom of plate 6. Provision is made so as not to clamp any portion of the plate 6 by the stud bolt 640 so as to allow freedom for turning on the stud bolt and yet have the parts snug so as to prevent wear and rattle between the parts. Turnplate 64 has two lugs 641, 641, between which swinging element 44 is pivotally mounted by means of pin 54. The swinging element 44 has two projecting portions 441, 442, see Fig. 5, which coact with the stops 41, 42. These stops 41, 42 consist of headed stud bolts screwing into the turnplate 64. The extent of projection of their heads may be adjusted by means of washers 643, see Figs. 7 and 8, having a cut-away portion for ease of insertion underneath the heads of the bolts 41, 42. Stops arranged in this way prevent the strain of impact of the swinging element 44 from coming upon the threads. All the force of the impact is resisted by the turnplate 64, through the washers 643 and the heads of the bolts. The swinging element 44 is connected to the element or carrier 1 by means of link 80, pivotally connected to each of these parts. The pivotal connections, however, are at right angles to each other, that of the link 80 to the swinging element 44 being accomplished by the pin 814 passing through the forked end of link 80 and through the swinging element 44. This connection allows of the swinging of the element 44 so that element 80 always lies in the plane of swing. The swinging of the link 80 is accomplished about the axis of stud bolt 640. When the link 80 swings, the turnplate 64 and swinging element 44 swing with it and all swing about the pivotal connection by the stud bolt 640. The actuating means, as hereinbefore referred to, is shown in the form of a rod 24 actuated by cam 3 and mounted as hereinbefore described.

In the modification shown in Figs. 9 and 10, a base plate 7 is bolted, as in the modifications hereinbefore described, to a stationary part. On the base plate 7 is adjustably mounted a plate 69 in the same way as shown and described in connection with Fig. 4 in reference to the plate 6 mounted on the base plate 7. The plate 69, however, has ways 691 upon which slides a vibrating element 49. This element 49 vibrates or slides on the ways 691 and is limited in its vibration or sliding by adjustable stops 91, 92. These stops 91, 92, are made adjustable by means of bolts 695, 696, screwing through lugs 697, 698, on plate 69 at the ends of the ways 691. The adjustment is shown using lock nuts, but washers such as shown in Fig. 8 could be used by inserting them back of stops 91, 92, and inside of lugs 697, 698. Link 800 connects the element or carrier 1 to the sliding or vibrating element 49. The connections are pivotal at each end of the link 800, that to the vibrating element 49 being made by the pin 89. This structure provides a means for vibrating the link 800 bodily on ways 691 691, and also pivoting same on pin 89; in other words, it provides a vibrating and pivotal coaction of the link with a stationary part. The vibrating element 49 is pivotal on an axis fixed as to link 800. It is obvious that the vibrating element 49 could be eliminated, a pin on the link 800 sliding directly on the ways 691 and the link swinging on the pin. The means for actuating the carrier 1 operates through rod 29 and is similar to the actuating means of Fig. 4, both of which actuating means have been hereinabove described.

In the operation of the device, the parts are so adjusted that the unrestricted upward actuation of the carrier 1 continues until the vibrating element 4, 44, 49, strikes the stop 51, 41, 91. With the arrangement as shown in Figs. 1 and 9, the vibrating elements 4, 49, move in planes perpendicular to the axis of the carriers 1, while in the device shown in Fig. 4 the vibrating element 44 has motion in a plane parallel to the axis of the carrier 1. This difference in direction of vibration of the elements 4, 44, 49, however, does not change the movements of the carriers 1. At this point link 8, 80, 800 constrains the carrier 1 to be swung about the pivot pin 81, 640, 89. The carrier 1 will then be swung forward with increasing acceleration due to the angularity of the link 8, 80, 800. At the end of the upward actuation of the carrier 1, it will be suddenly released and in falling, the vibrating element 4, 44, 49, will be vibrated to its opposite extreme position against the stop 52, 42, 92. From this point on, the carrier 1 will be swung rearwardly on link 8, 80, 800 about the pin 81, 640, 89, to its starting position with a retarded motion due to the angularity of the link 8, 80, 800. The path of the carrier, it will be noted, is a closed one and of such a nature that material placed thereon will be caused to travel forward.

It is claimed and desired to secure by Letters Patent:

1. The combination of an element mounted for motion in an irregular path, means for directly actuating said element, a link pivoted directly to said element, vibratable means pivoted to and movable by said link and vibrating during actuation of said element, and stops for said vibratable means whereby through said link the motion of said element is effected.

2. The combination of an element mounted for motion in an irregular path, means for directly actuating said element, a link pivoted to said element, vibratable means connected to said element through said link, and stationary stop means for said vibratable means whereby through said link the motion of said element is effected.

3. The combination of an element mounted for motion in an irregular path, means for directly actuating said element, a link pivoted to said element, vibratable means pivoted to said link, a stationary part to which said vibratable means is pivoted, and stops for said vibratable means whereby through said link the motion of said element is effected.

4. The combination of an element mounted for motion in an irregular path, means for directly actuating said element, a link pivoted to said element, vibratable means connected to said element through said link, a stationary part to which said vibratable means is pivoted, and stationary stop means for said vibratable means whereby through said link the motion of said element is effected.

In testimony whereof, I affix my signature in the presence of two witnesses.

DANIEL K. ALLISON.

Witnesses:
G. F. DE WEIN,
JOHN DAY, Jr.

---

Copies of this patent may be obtained for five cents each, by addressing the "Commissioner of Patents, Washington, D. C."